(12) United States Patent
Matsuura et al.

(10) Patent No.: US 10,054,683 B2
(45) Date of Patent: Aug. 21, 2018

(54) OBSTACLE DETECTION APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Mitsuyasu Matsuura, Nishio (JP); Tsuyoshi Ando, Kariya (JP); Takayuki Hiromitsu, Kariya (JP); Motonari Ohbayashi, Nagakute (JP); Hironobu Ishijima, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/515,567

(22) PCT Filed: Oct. 21, 2015

(86) PCT No.: PCT/JP2015/005293
§ 371 (c)(1),
(2) Date: Mar. 29, 2017

(87) PCT Pub. No.: WO2016/063524
PCT Pub. Date: Apr. 28, 2016

(65) Prior Publication Data
US 2017/0299720 A1 Oct. 19, 2017

(30) Foreign Application Priority Data
Oct. 22, 2014 (JP) ................. 2014-215721

(51) Int. Cl.
*G01S 15/00* (2006.01)
*G01S 15/93* (2006.01)
(Continued)

(52) U.S. Cl.
CPC ............ *G01S 15/931* (2013.01); *G01S 7/536* (2013.01); *G01S 15/08* (2013.01)

(58) Field of Classification Search
CPC combination set(s) only.
See application file for complete search history.

(56) References Cited

U.S. PATENT DOCUMENTS

| | | |
|---|---|---|
| 2010/0071471 A1 | 3/2010 | Matsumoto et al. |
| 2011/0148612 A1* | 6/2011 | Nakazono ............... G01S 7/527 340/435 |
| 2016/0209509 A1* | 7/2016 | Naruse .................. G01S 15/931 |

FOREIGN PATENT DOCUMENTS

| | | |
|---|---|---|
| JP | H3-057738 A | 3/1991 |
| JP | H4-250388 A | 9/1992 |

(Continued)

*Primary Examiner* — Anne M Antonucci
*Assistant Examiner* — Renee LaRose
(74) *Attorney, Agent, or Firm* — Knobbe, Martens, Olson & Bear, LLP

(57) ABSTRACT

An obstacle detection apparatus includes: a transceiver transmitting a transmission wave and receiving an ultrasonic wave; a transmission controller; a receiver circuit detecting a signal level of a receiving wave; a distance calculator sequentially calculating a distance to an object reflecting the transmission wave; a memory storing the distance to the object; an obstacle determinator determining whether the object is an obstacle; and a reception level monitoring device monitoring the signal level of the receiving wave before the transmission wave being transmitted. When the signal level exceeds a predetermined threshold, the obstacle determinator sets a first number of determination data elements to an increased number of determinations for a predetermined period to be used for determining whether the object is the obstacle, as being larger than a second number of determination data elements used when the signal level does not exceed the predetermined threshold.

8 Claims, 6 Drawing Sheets

(51) Int. Cl.
*G01S 15/08* (2006.01)
*G01S 7/536* (2006.01)

(56) References Cited

FOREIGN PATENT DOCUMENTS

| | | |
|---|---|---|
| JP | H6-186327 A | 7/1994 |
| JP | 2000-275344 A | 10/2000 |
| JP | 2007-114081 A | 5/2007 |
| WO | 2016/063523 A1 | 4/2016 |

* cited by examiner

OBSTACLE DETECTION APPARATUS

CROSS REFERENCE TO RELATED APPLICATION

This application is based on Japanese Patent Application No. 2014-215721 filed on Oct. 22, 2014, the disclosure of which is incorporated herein by reference.

TECHNICAL FIELD

The present disclosure relates to an obstacle detection apparatus that detects an obstacle by transmitting and receiving an ultrasonic wave.

BACKGROUND ART

An obstacle detection apparatus that detects an obstacle by transmitting and receiving an ultrasonic wave includes an ultrasonic sensor. The obstacle detection apparatus measures the time interval from a timing in which the ultrasonic sensor transmits an ultrasonic wave to a timing in which a reflected wave of this ultrasonic wave reflected by an object is received, to determine the distance to the object. Whether the object is an obstacle is determined based on the calculated distance to the object.

When there is an ultrasonic sensor of another device around the obstacle detection apparatus, crosstalk may occur. Crosstalk means reception, by the ultrasonic sensor of one's device, of a wave transmitted by the ultrasonic sensor of another device.

It is difficult to distinguish the wave transmitted from the other device from a reflected wave of the transmitted wave from the ultrasonic sensor of one's device. Therefore, crosstalk causes an error in the calculated distance, as a result of which the accuracy of obstacle determination is lowered. Such lowered accuracy may erroneously activate a driver assistance function that is executed based on the result of obstacle determination, such as setting off an alarm unnecessarily to draw attention of the driver to an obstacle.

In Patent Literature 1, to prevent crosstalk, an infrared sensor that transmits and receives an infrared beam is further provided, so as to synchronize the timing of transmitting an ultrasonic wave with that of other ultrasonic sensors.

However, providing an infrared sensor for preventing crosstalk causes a cost increase. To prevent crosstalk, the interval of transmitting a wave could be varied randomly. The time interval from a timing in which a wave is transmitted to a timing in which a reflected wave is received is not affected by the variation in the transmission interval. On the other hand, varying the time of transmitting a wave from the ultrasonic sensor of one's device randomly will cause the time lag in receiving a transmitted wave from the ultrasonic sensor of the other device to vary randomly. This is because the timing at which the ultrasonic sensor of the other device transmits a wave is not affected by the interval at which the ultrasonic sensor of one's device transmits a wave. Therefore, by varying the interval of transmitting a wave randomly, crosstalk can be distinguished.

For the crosstalk between obstacle detection apparatuses of the same type, the transmission interval of the ultrasonic sensor in the other obstacle detection apparatus would also be varied randomly. Even though the ultrasonic sensor of one's device varies its transmission interval, if the ultrasonic sensor of the other device also changes the transmission interval and this changed interval happens to be the same as that of the one's device, the crosstalk cannot be distinguished.

In order to minimize the possibility that these transmission intervals match, there needs to be as many transmission intervals as possible. With a large number of transmission intervals, however, the longest transmission interval will become longer, as compared to a case in which there are fewer transmission intervals. This is because the longest transmission interval cannot be made shorter than a length determined by the device's minimum processing cycle multiplied by the number of transmission intervals provided. Selecting one from this large number of transmission intervals randomly controls the transmission/reception cycle to be long.

PRIOR ART LITERATURES

Patent Literature

Patent Literature 1: JP 2007-114081 A

SUMMARY OF INVENTION

It is an object of the present disclosure to provide an obstacle detection apparatus that can reduce the possibility of erroneous determination of an obstacle due to crosstalk, minimize cost increases, and avoid an increase in the transmission/reception cycle.

An obstacle detection apparatus is mounted to a vehicle and includes: a transceiver that repeatedly transmits a transmission wave as an ultrasonic wave and receives an ultrasonic wave from outside; a transmission controller that controls the transceiver to transmit the transmission wave; a receiver circuit that detects a signal level of a receiving wave as the ultrasonic wave received by the transceiver; a distance calculator that sequentially calculates a distance to an object, which reflects the transmission wave based on a time interval between a time point at which the transmission wave is transmitted from the transceiver and a wave reception time point defined from a signal level of the receiving wave detected by the receiver circuit; a memory that stores the distance to the object calculated by the distance calculator; an obstacle determinator that determines whether the object is an obstacle based on the distance to the object stored in the memory and a current distance to the object calculated by the distance calculator; and a reception level monitoring device that monitors the signal level of the receiving wave detected by the receiver circuit before the transmission controller controls the transceiver to transmit the transmission wave. Furthermore, when the signal level of the receiving wave monitored by the reception level monitoring device exceeds a predetermined threshold, the obstacle determinator sets a first number of determination data elements to an increased number of determinations for a predetermined period, the first number of determination data elements being a number of data elements of the distance to the object to be used for determining whether the object is the obstacle, the increased number of determinations being larger than a second number of determination data elements to be used for a situation in which the signal level of the receiving wave does not exceed the predetermined threshold.

According to one aspect of the present disclosure, the signal level of the receiving wave detected by the receiver circuit is monitored before the transmission controller controls the transceiver to transmit a wave. Since it is before the transmission of the wave, when the signal level of the receiving wave is high, it is highly likely that a wave transmitted from the transceiver included in the other device is being received. At this point, since it is before the wave transmission, reception of the wave transmitted from the transceiver included in the other device does not affect the distance to the object determined by the distance calculator. There may well be a case, however, where, after that, the timing at which the transceiver included in the other device transmits a wave is gradually shifted, and the transceiver of the other device happens to transmit a wave after the transceiver of one's device has transmitted a wave.

In the present disclosure, therefore, when the signal level of the receiving wave monitored by the reception level monitoring device before the transmission of a wave exceeds a predetermined threshold, the first number of determination data elements is set to an increased number of determinations that is larger than a second number of determination data elements for when the signal level of the receiving wave does not exceed the predetermined threshold during a predetermined period. Since the first number of determination data elements is increased, it is less likely that an object is determined as an obstacle due to crosstalk. Thus the possibility of a false obstacle determination due to crosstalk is reduced.

After the transceiver of the other device has begun transmitting a wave after the transmission of a wave from the transceiver of one's device, it is difficult to determine whether the receiving wave detected by the receiver circuit is a reflected wave of the transmitted wave from the transceiver of one's device, or of the transmitted wave from the transceiver of the other device. In the present disclosure, however, the signal level of the receiving wave is monitored before the transmission of a wave from the transceiver of one's device, so that an accurate determination is made that a transmitted wave from the transceiver of the other device may possibly be received by the transceiver of one's device. Therefore, the first number of determination data elements is not increased when it need not be increased.

Since the possibility of false determination is reduced by the control whereby the first number of determination data elements is increased, no hardware such as an infrared sensor needs to be added. Thus cost increase can be minimized.

Since there is no need to select a transmission interval from a large number of transmission intervals, the transmission/reception cycle is prevented from becoming longer.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
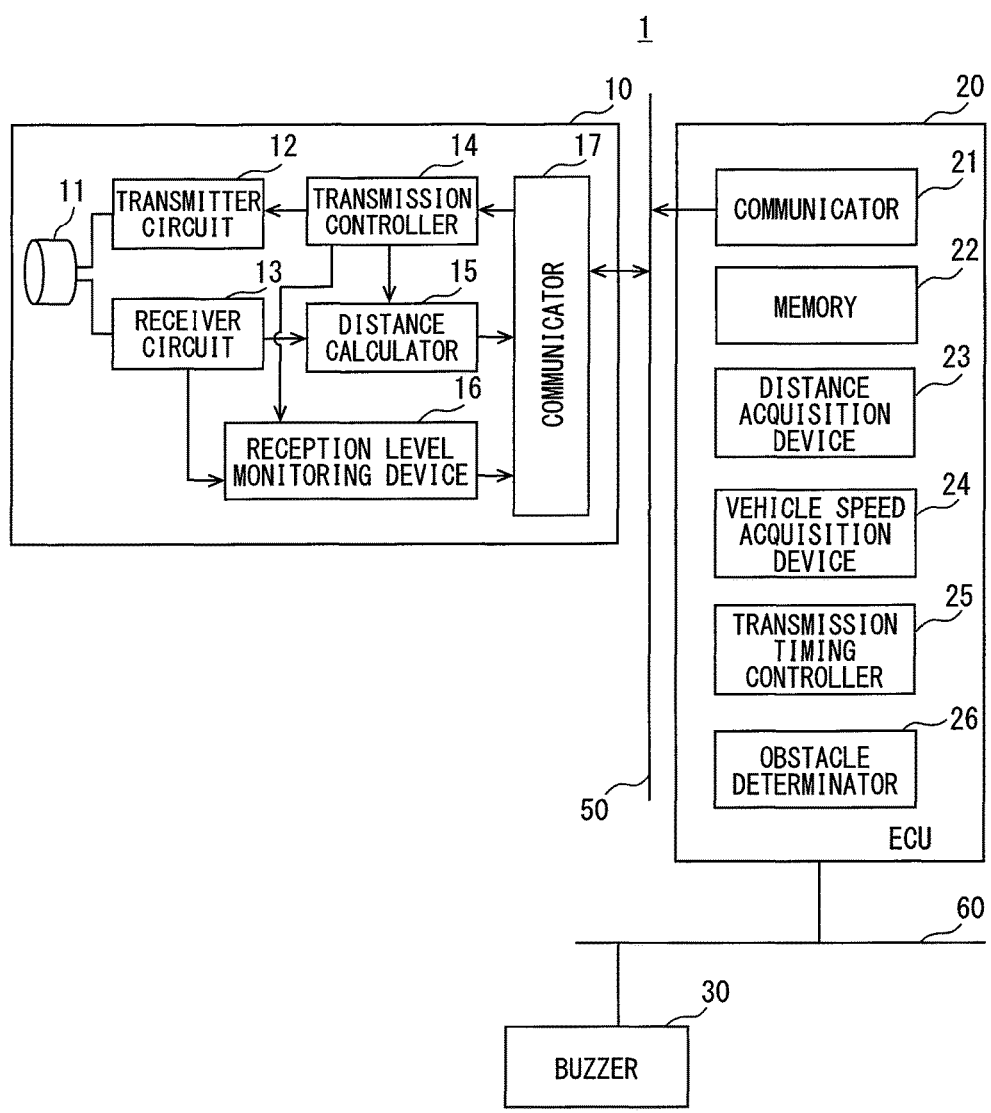
FIG. 1 is a configuration diagram showing a driver assistance system of a first embodiment.

A first embodiment of the present disclosure will be hereinafter described with reference to the drawings. A driver assistance system 1 shown in FIG. 1 is mounted to a vehicle and includes an ultrasonic sensor 10, an ECU 20, and a buzzer 30. The ultrasonic sensor 10 and ECU 20 configure the obstacle detection apparatus.

(Configuration of Ultrasonic Sensor 10)

The ultrasonic sensor 10 is arranged at one of the front end face, rear end face, and side face of the vehicle. The ultrasonic sensor 10 includes a transceiver 11, a transmitter circuit 12, a receiver circuit 13, a transmission controller 14, a distance calculator 15, a reception level monitoring device 16, and a communicator 17.

The transceiver 11 generates a wave that is an ultrasonic wave and transmits this wave, as well as receives an ultrasonic wave coming from outside, that is, a receiving wave. The transceiver then outputs a signal indicative of the intensity of the receiving wave to the receiver circuit 13.

The transmitter circuit 12 generates a pulse signal when a transmission instruction signal is input from the transmission controller 14, and outputs this pulse signal to the transceiver 11. The transceiver 11 is activated by this pulse signal and transmits waves in pulses.

The receiver circuit 13 amplifies and performs A/D conversion on the signal which is input from the transceiver 11 and which indicates the intensity of the receiving wave, and outputs a signal after the amplification and A/D conversion (hereinafter, reception signal) to the distance calculator 15.

The transmission controller 14 outputs a transmission instruction signal to the transmitter circuit 12 when the transmission controller 14 acquires the transmission instruction signal transmitted from the ECU 20 from the communication device 17. The transmission controller 14 also notifies the distance calculator 15 that the transmission controller 14 has output the transmission instruction signal.

The distance calculator 15 determines the distance to an object based on the time interval from a timing in which the transceiver 11 transmits a wave to a timing in which a receiving wave with an intensity of not less than an object detection threshold is received. The time point when the transceiver 11 transmits a transmitted wave is the time point when it receives a notification from the transmission controller 14 that a transmission instruction signal has been output. The time point when a receiving wave is received with an intensity of not less than an object detection threshold is the time point when the reception signal exceeds the object detection threshold for the first time after a predetermined time has passed from the transmission of the transmitted wave. A predetermined time period is let pass so as to exclude the period in which reverberation of the transmitted wave exists. This time interval multiplied by the speed of sound and divided by two is the distance to the object. The distance to the object determined by the distance calculator 15 will be hereinafter referred to as detected distance.

The reception level monitoring device 16 monitors the reception signal level, i.e., the intensity of the reception signal, before the transmission controller 14 controls the transceiver 11 to transmit a wave. When the reception signal level is not less than the object detection threshold, and the time period during which the reception signal level exceeds the object detection threshold is close to the transmission period of the transmitted wave, it is determined that a crosstalk wave has been received. A crosstalk wave is a wave transmitted from an ultrasonic sensor other than the ultrasonic sensor 10 of one's driver assistance system 1. The ECU 20 is notified of the detection of a crosstalk wave via the communicator 17.

The communicator 17 transmits the detected distance determined by the distance calculator 15, and the notification which is output by the reception level monitoring device 16 and which indicates that a receiving wave with an intensity of not less than the object detection threshold has been detected, to the communicator 21 of the ECU 20 via the LIN bus 50. The communicator 17 receives transmission instruction signals transmitted from the communicator 21 of the ECU 20, and outputs the transmission instruction signals to the transmission controller 14.

(Configuration of ECU 20)

The ECU 20 includes the communicator 21, a memory 22, a distance acquisition device 23, a vehicle speed acquisition device 24, a transmission timing controller 25, and an obstacle determinator 26. This ECU 20 is a known circuit configuration that includes a CPU, ROM, RAM, I/O interface, and the like. The CPU executes programs stored in the ROM so that the ECU 20 functions as the distance acquisition device 23, vehicle speed acquisition device 24, transmission timing controller 25, and obstacle determinator 26. Some or all of the functions executed by the ECU 20 may be configured as hardware with one or a plurality of ICs or the like.

The communicator 21 is a communication interface and communicates with the ultrasonic sensor 10 via the LIN bus 50. The ECU 20 outputs a sound signal to the buzzer 30 via an in-vehicle LAN 60. The memory 22 is a rewritable memory and stores detected distances acquired by the distance acquisition device 23. The distance acquisition device 23 acquires the detected distance determined by the distance calculator 15 of the ultrasonic sensor 10 via the communicator 21 and LIN bus 50, and stores the acquired detected distance in the memory 22.

The vehicle speed acquisition device 24 acquires vehicle speeds via the in-vehicle LAN 60. The transmission timing controller 25 outputs a transmission instruction signal to the ultrasonic sensor 10 to control the timing at which a transmitted wave is transmitted from the ultrasonic sensor 10. The obstacle determinator 26 determines whether there is an obstacle within the detected distance based on the current detected distance acquired from the ultrasonic sensor 10 and the detected distance stored in the memory 22. The buzzer 30 goes off when the sound signal is input from the obstacle determinator 26.

The process executed by the distance acquisition device 23, vehicle speed acquisition device 24, transmission timing controller 25, and obstacle determinator 26 will be described later in more detail with reference to FIG. 3 and FIG. 4.

(Process Executed by Ultrasonic Sensor 10)

Figure 2:
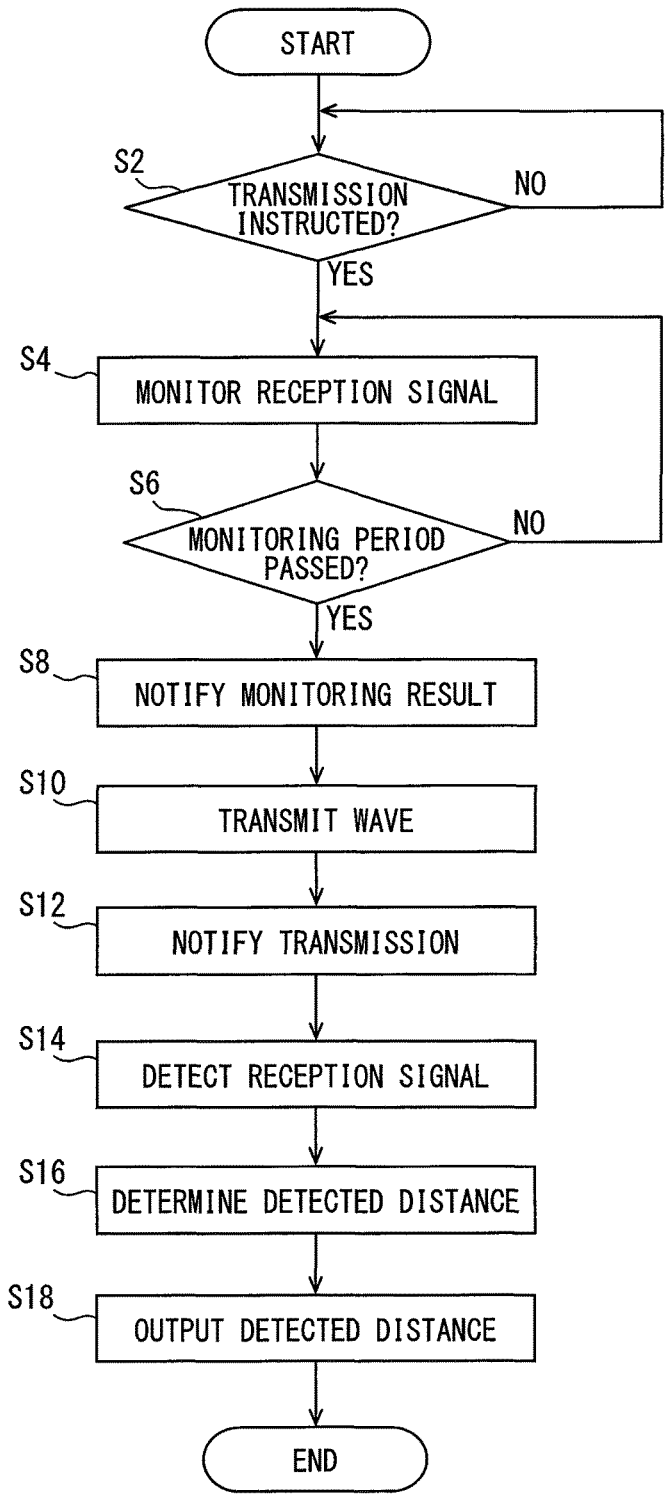
FIG. 2 is a flowchart showing a process executed by an ultrasonic sensor.

Next, the flow of the process executed by the ultrasonic sensor 10 will be described with reference to FIG. 2. The ultrasonic sensor 10 executes this process shown in FIG. 2 repeatedly, for example, during power application. In FIG. 2, steps S2, S10, and S12 are performed by the transmission controller 14, steps S4 to S8 are performed by the reception level monitoring device 16, step S14 is performed by the receiver circuit 13, and steps S16 and S18 are performed by the distance calculator 15.

At step S2, it is determined whether a transmission instruction signal output by the transmission timing controller 25 of the ECU 20 has been acquired via the communicator 17. If this determination is NO, step S2 is repeated, whereas, if YES, the process goes to step S4.

At step S4, the level of the reception signal is monitored. At step S6, it is determined whether a predetermined monitoring period has passed. If this determination is NO, the process goes back to step S4 and the monitoring of the reception signal level is continued. When the determination at step S6 is YES, the process goes to step S8.

At step S8, the monitoring result is transmitted to the ECU 20. The monitoring result is whether a crosstalk wave has been detected. Whether a crosstalk wave has been detected is determined, as described above, based on whether the period during which the reception signal level exceeds the object detection threshold is close to the transmission period of the transmitted wave. Provided that the transmitted wave is transmitted for a period of T1, if the period during which the reception signal level exceeds the object detection threshold is within a fixed range defined on the basis of the period T1, it is determined that the period during which the reception signal level exceeds the object detection threshold is close to the transmission period of the transmitted wave. The object detection threshold corresponds to the predetermined threshold.

At step S10, a wave is transmitted from the transceiver 11. Namely, a transmission instruction signal is output to the transmitter circuit 12. When the transmission instruction signal is input, the transmitter circuit 12 generates a pulse signal, and outputs this pulse signal to the transceiver 11. Thus waves are transmitted in pulses from the transceiver 11. At step S12, the distance calculator 15 is notified that a transmission instruction signal has been output.

At step S14, the reception signal is detected for a predetermined period of transmission/reception. This transmission/reception period starts at the time point when the wave is transmitted. At step S16, the time interval from when a wave was transmitted to when the level of the reception signal exceeded the object detection threshold is determined, and this time interval is multiplied by the speed of sound and divided by two, to produce a detected distance. The time point at which the reception signal level exceeds the object detection threshold is the receiving wave reception time point. At step S18, the detected distance calculated at step S16 is output to the ECU 20. The notification of the monitoring result at step S8 may be performed at the same time at step S18. Namely, the monitoring result and the detected distance may be stored in one communication frame. This way, the communication time can be shortened.

(Process Executed by ECU 20)

Next, the process executed by the distance acquisition device 23, vehicle speed acquisition device 24, transmission timing controller 25, and obstacle determinator 26 of the ECU 20 will be described with reference to FIG. 3 and FIG. 4. The process shown in FIG. 3 is executed repeatedly when a predetermined obstacle detection condition is established. The obstacle detection condition is, for example, a condition that the vehicle speed is less than a certain value. The certain value of vehicle speed is 30 km/h, for example.

Figure 3:
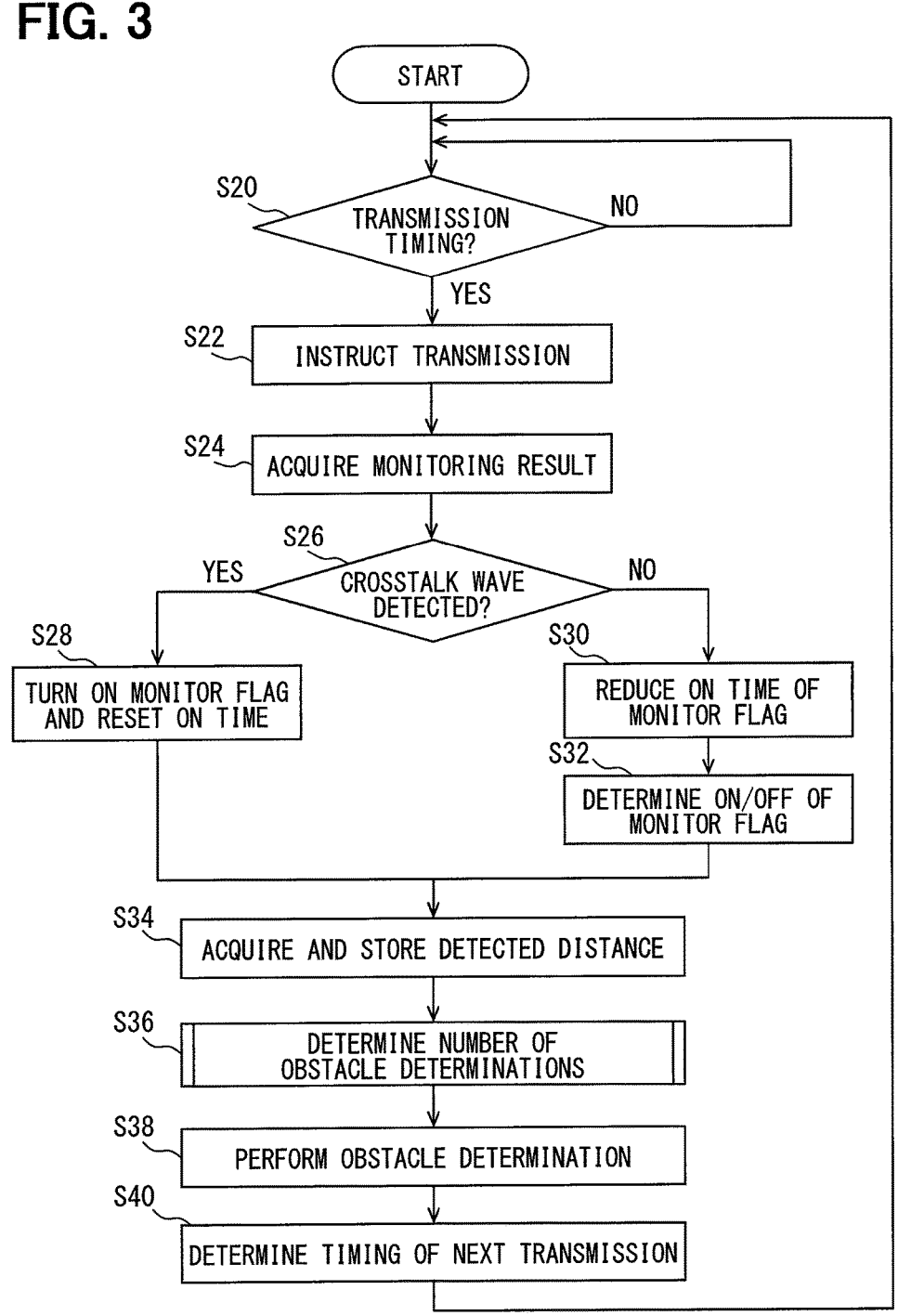
FIG. 3 is a flowchart showing a process executed by a distance acquisition device, a vehicle speed acquisition device, a transmission timing controller, and an obstacle determinator of an ECU.

In FIG. 3, steps S20 and S22 are executed by the transmission timing controller 25. At step S20, it is determined whether the transmission timing is arrived at. The transmission timing is determined at step S40 to be described later.

If the determination at step S20 is NO, step S20 is repeated. If the determination at step S20 is YES, the process goes to step S22.

At step S22, a transmission instruction signal is output to the ultrasonic sensor 10 via the communicator 21 and LIN bus 50.

Steps S24 to S32 are executed by the obstacle determinator 26. At step S24, the monitoring result is acquired from the ultrasonic sensor 10. At step S26, it is determined whether the ultrasonic sensor 10 has detected a crosstalk wave. This determination is made from the monitoring result transmitted from the ultrasonic sensor 10.

When it is determined that a crosstalk wave has been detected, i.e., when the determination is YES at step S26, the process goes to step S28. When it is determined that a crosstalk wave has not been detected, i.e., when the determination is NO at step S26, the process goes to step S30.

At step S28, a monitor flag is turned to the ON state, and the ON time is reset. When reset, the ON time becomes a predetermined period of time. This predetermined period time is several to 20 seconds for example, because if it is too long, the time point for making an obstacle determination is kept delayed. The period would differ also depending on the method of controlling the timing of transmitting a wave from the ultrasonic sensor 10 and the conceivable source of crosstalk.

At step S30 that is performed when the determination at step S26 is NO, when the monitor flag is at an ON state, the ON time of the monitor flag is reduced by the cycle in which this step S30 is performed. When the monitor flag is an OFF state, step S30 is not performed, and the process goes to step S32.

At step S32, it is determined whether the monitor flag is at the ON state or at the OFF state. At the time point when step S32 is performed, if the monitor flag is at the ON state and the ON time is longer than 0, the monitor flag is maintained ON. If the ON time is not longer than 0, the monitor flag is turned to the OFF state. At the time point when step S32 is performed, if the monitor flag is at the OFF state, the monitor flag is maintained at the OFF state.

After step S28 or step S32 has been performed, the process goes to step S34. At step S34, a detected distance is acquired from the ultrasonic sensor 10. The acquired detected distance is stored in the memory 22. This step S34 is performed by the distance acquisition device 23. Step S34 may be performed at the same time as step S24. Namely, the monitoring result and the detected distance may be stored in one communication frame. This way, the communication time can be shortened.

At step S36 that follows, the number of obstacle determinations is decided. This process of step S36 is illustrated in FIG. 4 in detail. In FIG. 4, step S56 is performed by the vehicle speed acquisition device 24. Other steps are performed by the obstacle determinator 26.

At step S50, it is determined whether the monitor flag is at the ON state. If this determination is NO, the process goes to step S52. At step S52, the number of determination data elements, which is the number of detected distance data elements to be used for the determination of whether an object detected by the ultrasonic sensor 10, i.e., an object present within the detected distance output by the ultrasonic sensor 10, is an obstacle, is set to a preset regular number of determinations.

If the determination at step S50 is YES, the process goes to step S54. At step S54, it is determined whether the detected distance is shorter than a preset short distance threshold. If this determination is NO, the process also goes to step S52, where the number of determination data elements is set to the regular number of determinations. If the determination at step S54 is YES, the process goes to step S56.

At step S56, a vehicle speed is acquired. At step S58 that follows, it is determined whether the vehicle is running, based on the vehicle speed acquired at step S56. If the vehicle is determined to be running (S58: YES), the process goes to step S52, where the number of determination data elements is set to the regular number of determinations. If the vehicle is determined to be not running (S58: YES), the process goes to step S60.

At step S60, the number of determination data elements is set to an increased number of determinations that is larger than the regular number of determinations. When step S60 or S52 has been executed and the number of determination data elements has been decided, the process of FIG. 4 is ended. When the process of FIG. 4 is ended, step S38 of FIG. 3 is performed.

At step S38, it is determined whether the object present within the detected distance is an obstacle, based on the detected distance currently acquired at step S34, and the detected distance stored in the memory 22, i.e., a past detected distance. Whether the object present within the detected distance is an obstacle is determined, more specifically, by determining whether an obstacle determination condition has been established, based on the detected distance, a detected distance threshold, and the number of determination data elements. For example, when the repeated number of times the detected distance assumes a value not more than the detected distance threshold has exceeded the number of determination data elements, this constitutes the obstacle determination condition. When the obstacle determination condition is established, the buzzer 30 is set off to notify the driver of the vehicle that an obstacle has been detected.

There may be a plurality of detected distance thresholds, with a number of determination data elements set for each detected distance threshold. For example, a relatively smaller value may be set as the number of determination data elements for a relatively smaller detected distance threshold. This way, if the obstacle is present in a short distance, the determination can be made quickly. When there are a plurality of detected distance thresholds, with a number of determination data elements set for each detected distance threshold, the regular number of determinations and the increased number of determinations are to be determined for each detected distance threshold.

At step S40 that follows, the timing of next transmission is determined. The next transmission timing is the time point when a waiting time has passed, after the lapse of a transmission/reception period. There are a plurality of options for this waiting time; different ones of several waiting times are used sequentially, or a randomly selected waiting time is used, to determine the next transmission timing.

Even if the longest one of the plurality of waiting times is selected, the transmission timing is not made too long. For example, the longest waiting time may be 15 ms. Provided that the longest waiting time is 15 ms, and the minimum processing cycle is 5 ms, there can be provided three waiting times at most. In the present embodiment, therefore, the number of several waiting time options to be provided is about five at most.

Effects of Embodiment

According to the embodiment described above, the reception level monitoring device 16 of the ultrasonic sensor 10 monitors the reception signal level detected by the receiver circuit 13 (S4, S6) before the transmission controller 14 controls the transceiver 11 to transmit a wave.

Since this is before the ultrasonic sensor 10 of its own transmits a wave, there is no possibility of receiving a reflected wave of the wave transmitted from the ultrasonic sensor and reflected by the object. Therefore, when the reception signal level is high, it is highly likely that a wave transmitted from an ultrasonic sensor 10 included in another device is being received. At this point, since it is before a wave is transmitted from its own sensor, reception of the wave transmitted from the ultrasonic sensor 10 included in the other device does not affect the detected distance determined by the distance calculator 15. There may well be a case, however, where, after that, the timing at which the ultrasonic sensor 10 included in the other device transmits a wave is gradually shifted, and the ultrasonic sensor 10 of the other device happens to transmit a wave after the transceiver 11 of one's device has transmitted a wave.

Therefore, in the present embodiment, a monitor flag is turned to the ON state and the ON time is reset, when the reception signal level being monitored by the reception level monitoring device 16 exceeds an object detection threshold before the transmission of a wave. The ON time is continued for a predetermined period of time. When the monitor flag is at the ON state and the determination at step S54 is YES while the determination at step S58 is NO, the number of determination data elements is set to be an increased number of determinations (S60) that is larger than the regular number of determinations. Since there are a larger number of determination data elements, it is less likely that an object is determined as an obstacle due to crosstalk. Namely, the possibility of a false determination that an obstacle is present even though there is no object that should be determined as an obstacle, caused by crosstalk, is reduced.

After the ultrasonic sensor 10 of the other device has begun transmitting a wave after the transmission of a wave from the ultrasonic sensor 10 of one's device, it is difficult to determine whether the receiving wave is a reflected wave of the transmitted wave from one's device, or of the transmitted wave from the other device. In the present embodiment, however, the reception signal level is monitored before the transmission of a wave from the transceiver 11 of one's device, so that an accurate determination is made that a transmitted wave from the ultrasonic sensor 10 of the other device is possibly received by the ultrasonic sensor 10 of one's device. Therefore, the number of determination data elements is not increased when it need not be increased.

In the present embodiment, also, no hardware such as an infrared sensor is added for reducing the erroneous determination, so that a cost increase is minimized.

In the present embodiment, while there are provided a plurality of waiting time options to change the transmission interval, even the longest one of the plurality of waiting times is set such that the transmission timing will not be too long. Namely, the transmission/reception cycle, which is the period of time from the timing of one transmission to a next transmission, is prevented from being prolonged.

In the present embodiment, even when the monitor flag is at the ON state (S50: YES), if the detected distance is not more than a short distance threshold (S54: NO), the number of determination data elements is set to be the regular number of determinations. That is, when a crosstalk wave has been detected before the transmission of a wave and the detected distance is not more than a short distance threshold, the number of determination data elements is not increased, even if the ON time has not lapsed from the time point of the detection. This way, the timing of obstacle determination is prevented from becoming late when there is an object present in a short distance.

Moreover, in the present embodiment, even when the monitor flag is at the ON state (S50: YES), if the vehicle is running (S58: YES), the number of determination data elements is set to be the regular number of determinations. Therefore, the timing of obstacle determination is prevented from becoming late during the running of the vehicle when obstacle determination needs to be made quickly as compared to when the vehicle is at a standstill. Since the relative positional relationship with the source of crosstalk changes with each passing moment when the vehicle is running, the risk of a false obstacle determination due to crosstalk is considered to be low as compared to when the vehicle is at a standstill, and priority is given to speediness of the obstacle determination.

In the present embodiment, in determining whether a crosstalk wave has been detected, it is determined whether the time period during which the reception signal level exceeds the object detection threshold is close to the transmission period of the transmitted wave (S8), in addition to the determination of whether the reception signal level has exceeded the object determination threshold. This way, the possibility of unnecessarily increasing the number of determination data elements, which is intended for crosstalk identification, based on a non-crosstalk-induced ultrasonic wave received by the ultrasonic sensor 10, is reduced. Namely, the possibility of increasing the number of determination data elements when there is no crosstalk is reduced.

In the present embodiment, also, the timing of next transmission is changed sequentially. Thereby, even when a wave transmitted from the other device is received due to crosstalk, the time interval from a timing in which the transceiver 11 of one's device transmitted a wave to a timing in which the wave transmitted from the other device was received due to crosstalk will more likely fluctuate. With the increased number of determinations, in particular, since the number of data elements is increased, it is even more likely that the time interval will fluctuate during the determinations by the increased number. Thus the possibility of making a false obstacle determination due to crosstalk is further reduced.

Second Embodiment

Next, a second embodiment will be described. In the description of the second embodiment and the following embodiments, the elements given the same reference numerals as those that have been used before are, unless otherwise specified, the same as the elements with the same reference numerals in the preceding embodiment. Where only some features of a configuration are explained, the above-described embodiment can be applied to other features of the configuration.

Figure 5:
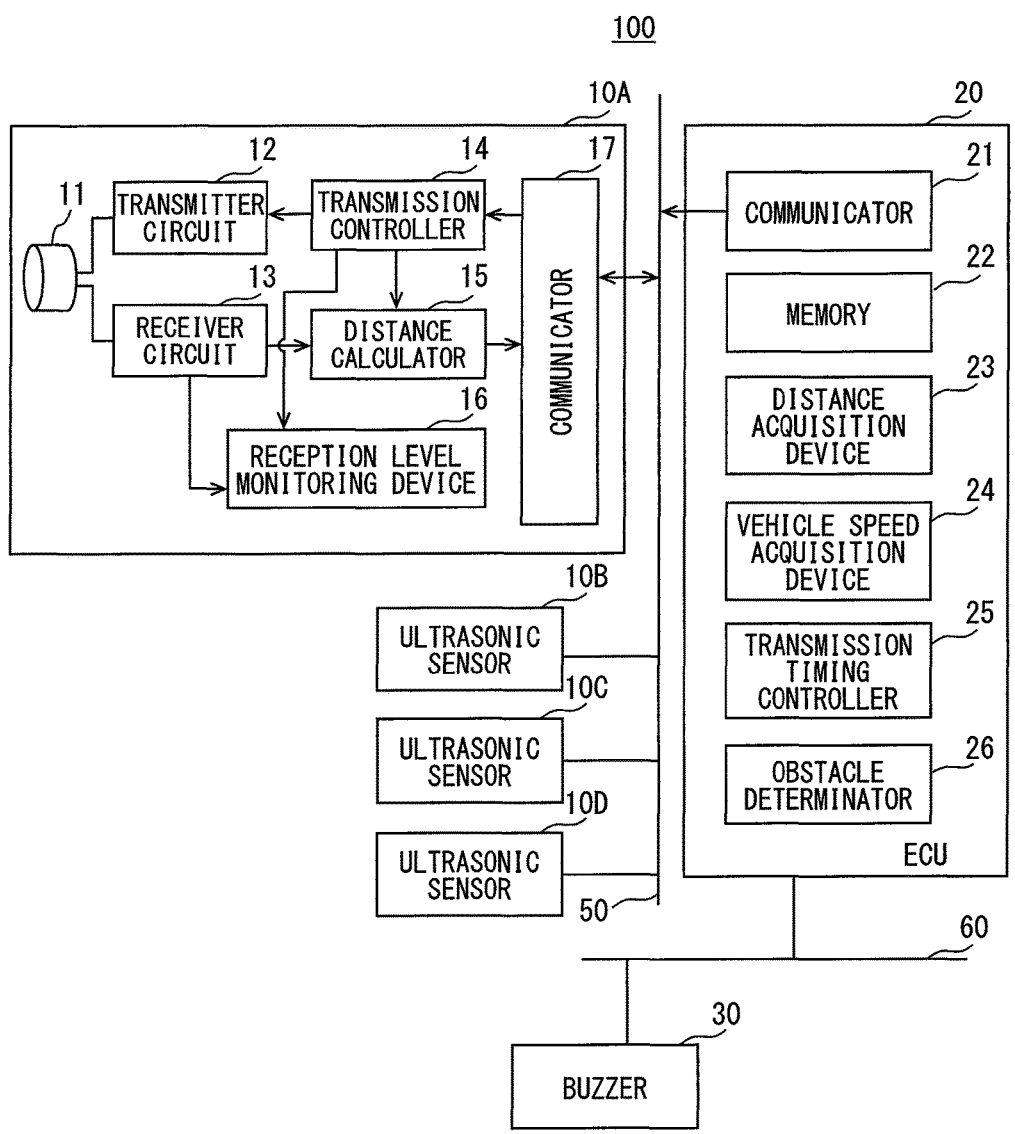
FIG. 5 is a configuration diagram showing a driver assistance system of a second embodiment.

In the second embodiment, as shown in FIG. 5, a driver assistance system 100 includes four ultrasonic sensors 10A to 10D. All of these four ultrasonic sensors 10A to 10D are configured the same as the ultrasonic sensor 10 of the first embodiment.

Figure 6:
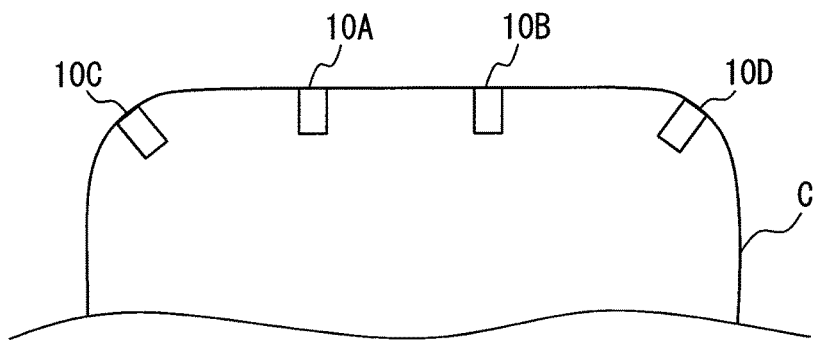
FIG. 6 is a diagram showing positions where ultrasonic sensors are attached.

The four ultrasonic sensors 10A to 10D are all provided to one end face, i.e., front end face or rear end face, of a vehicle C, as shown in FIG. 6. Here, the ultrasonic sensors 10A and 10B are disposed in a linear part of the end face of the vehicle C, while the ultrasonic sensors 10C and 10D are each disposed in a corner part of the vehicle C.

Four ultrasonic sensors 10 each may be provided to both end faces of the vehicle C. When there are four ultrasonic sensors 10 each provided to both end faces of the vehicle C, the four ultrasonic sensors 10 on one end face are controlled in the same manner as the ultrasonic sensors 10 on the other end face. Therefore, in the present embodiment, for the convenience of explanation, four ultrasonic sensors 10 are described as being arranged at one end face of the vehicle C.

Figure 7:
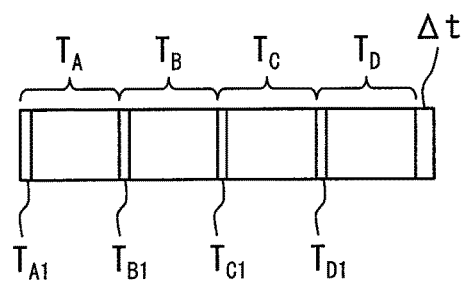
FIG. 7 is a diagram showing a configuration of one transmission/reception cycle in the second embodiment.

Also, in the second embodiment, the ECU 20 executes the process of FIG. 3. The following process steps are different from those of the first embodiment. At step S20, it is determined whether the transmission timing is arrived at. In the second embodiment where the four ultrasonic sensors 10A to 10D are provided, ultrasonic waves are transmitted and received by these four ultrasonic sensors 10A and 10D sequentially. FIG. 7 illustrates the configuration of one transmission/reception cycle in the second embodiment. In FIG. 7, $T_A$, $T_B$, $T_C$, and $T_D$ respectively indicate the transmission/reception periods of the ultrasonic sensors 10A to 10D.

Each of the transmission/reception periods $T_A$, $T_B$, $T_C$, and $T_D$ includes a monitoring period $T_{A1}$, $T_{B1}$, $T_{C1}$, and $T_{D1}$ at the beginning, and a wave is transmitted after these monitoring periods $T_{A1}$, $T_{B1}$, $T_{C1}$, and $T_{D1}$ have lapsed. Therefore, during each monitoring period $T_{A1}$, $T_{B1}$, $T_{C1}$, and $T_{D1}$, none of the ultrasonic sensors 10A to 10D is transmitting a wave. Reference symbol $\Delta t$ represents a waiting time. Alternatively, unlike the transmission/reception cycle pattern shown in FIG. 7, the ultrasonic sensors 10C and 10D may transmit and receive an ultrasonic wave at the same time.

At step S20 in the second embodiment, the transmission timing of each ultrasonic sensor 10A to 10D is determined in accordance with the preset transmission/reception cycle such as that shown in FIG. 7.

At step S28, the monitor flag is turned ON and the ON time is reset in the ultrasonic sensor 10 that has detected a crosstalk wave, and in addition, in ultrasonic sensors 10 adjacent to that ultrasonic sensor 10. For example, when the ultrasonic sensor 10A detects a crosstalk wave, the monitor flag is turned to the ON state, and the ON time is reset in the ultrasonic sensors 10C and 10B, in addition to the ultrasonic sensor 10A. Other process steps are the same as those of the first embodiment.

Effects of Second Embodiment

In the second embodiment, the monitor flag is turned to the ON state and the ON time is reset in the ultrasonic sensor 10 that has detected a crosstalk wave, and in addition, in ultrasonic sensors 10 adjacent to that ultrasonic sensor 10. This way, the number of determination data elements is set to an increased number of determinations during the ON time in the ultrasonic sensor 10 that has detected a crosstalk wave, and in addition, in the ultrasonic sensors 10 adjacent to that ultrasonic sensor 10, too.

In the ultrasonic sensors 10 adjacent to the ultrasonic sensor 10 that has detected a crosstalk wave, it is more likely that crosstalk will occur later. Therefore, with the second embodiment, the possibility of a false obstacle determination that an obstacle is present is reduced also in the ultrasonic sensors 10 adjacent to the ultrasonic sensor 10 that has detected a crosstalk wave.

While the embodiments of the present disclosure have been described above, the present disclosure is not limited to the embodiments described above and the technical scope of the present disclosure includes the following variations. The present disclosure can be embodied with various changes other than those described below without departing from the scope of the subject matter.

Variation 1

When there are a plurality of ultrasonic sensors 10A to 10D on one end face of the vehicle C, for example as in the second embodiment, the following control may be executed if at least one of these ultrasonic sensors 10A to 10D detects a crosstalk wave. Namely, the monitor flag may be turned to the ON state, and the ON time may be reset in all of these ultrasonic sensors 10A to 10D. Thereby, the number of determination data elements is set to the increased number of determinations during the ON time in all of the ultrasonic sensors 10A to 10D.

Variation 2

In the above-described embodiment, when the reception signal level is not less than an object detection threshold, and the time period during which the reception signal level exceeds the object detection threshold is close to the transmission period of the transmitted wave, it is determined that a crosstalk wave has been detected. Instead, the period during which the reception signal level exceeds the object detection threshold need not necessarily be used as the condition, and it may be determined that a crosstalk wave has been detected if the reception signal level is not less than the object detection threshold.

Variation 3

Instead of, or in addition to setting off the buzzer 30, when it is determined that an obstacle has been detected, control may be executed to reduce speed of the vehicle or stop the vehicle.

Variation 4

The ultrasonic sensor 10 adjacent to the ultrasonic sensor 10 that transmits a wave may perform reception of an ultrasonic wave only to obtain the detected distance. For example, in the arrangement of FIG. 6, after the ultrasonic sensor 10A transmits a wave, the ultrasonic sensors 10C and 10B, in addition to the ultrasonic sensor 10A, receive a receiving wave to determine the distance for the same period of time as that of the ultrasonic sensor 10A. In this case, in addition to the ultrasonic sensor that transmits a wave, the ultrasonic sensors 10 that perform reception only may monitor the reception signal during the monitoring period, and transmit the monitoring result to the ECU 20.

Variations 5 and 6

Figure 4:
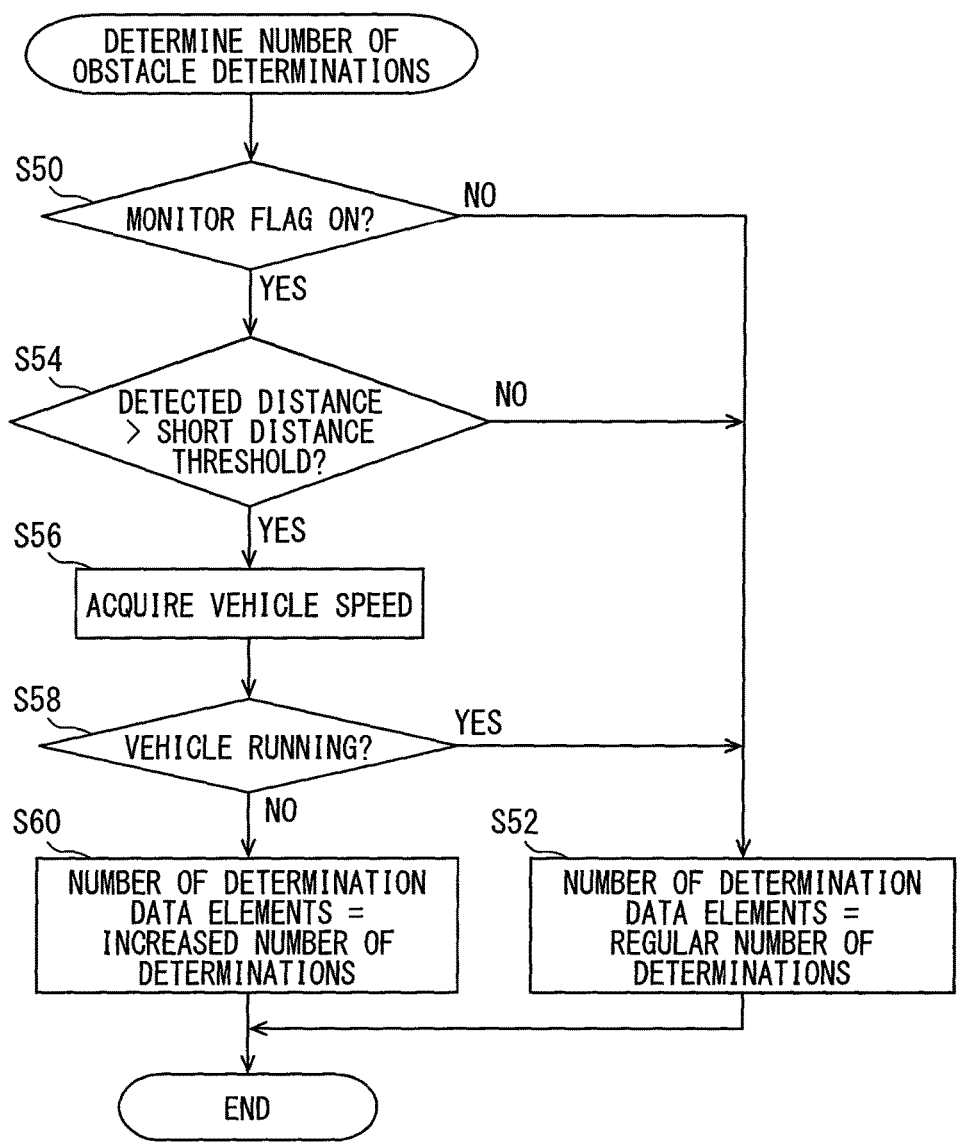
FIG. 4 is a flowchart showing a process of step S36 in FIG. 3 in detail.

Step S54 of FIG. 4 may be omitted (variation 5). Alternatively, steps S56 and S58 may be omitted (variation 6).

Variation 7

In the above-described embodiments, the ultrasonic sensor 10 includes the distance calculator 15. Instead, the ECU 20 may include the distance calculator 15. Namely, the ECU 20 may calculate the detected distance.

If the detected distance is to be calculated by the ECU 20, the ultrasonic sensor 10 performs calculations to produce the time interval described above, and transmits this time interval to the ECU 20. The ECU 20 multiplies the time interval by the speed of sound and divides it by two to produce the detected distance.

Alternatively, the time interval may also be calculated by the ECU 20. In this case, the ultrasonic sensor 10 transmits to the ECU 20 a signal indicating that a reflected wave with an intensity of not less than an object detection threshold has been received. The time point at which the transceiver 11 of the ultrasonic sensor 10 transmitted a wave may be either the time point when that ultrasonic sensor 10 notifies the ECU of the transmission of the transmitted wave, or the time point when the ECU 20 outputs a transmission instruction signal to the ultrasonic sensor 10.

It is noted that a flowchart or the processing of the flowchart in the present application includes sections (also referred to as steps), each of which is represented, for instance, as S2. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. An obstacle detection apparatus mounted to a vehicle and comprising:
   a transceiver that repeatedly transmits a transmission wave as an ultrasonic wave and receives an ultrasonic wave from outside;
   a transmission controller that controls the transceiver to transmit the transmission wave;
   a receiver circuit that detects a signal level of a receiving wave as the ultrasonic wave received by the transceiver;
   a distance calculator that sequentially calculates a distance to an object, which reflects the transmission wave based on a time interval between a time point at which the transmission wave is transmitted from the transceiver and a wave reception time point defined from a signal level of the receiving wave detected by the receiver circuit;
   a memory that stores the distance to the object calculated by the distance calculator;
   an obstacle determinator that determines whether the object is an obstacle based on the distance to the object stored in the memory and a current distance to the object calculated by the distance calculator; and
   a reception level monitoring device that monitors the signal level of the receiving wave detected by the receiver circuit before the transmission controller controls the transceiver to transmit the transmission wave; and
   a vehicle speed acquisition device that acquires a vehicle speed of the vehicle,
   wherein, when the signal level of the receiving wave monitored by the reception level monitoring device exceeds a predetermined threshold, the obstacle determinator sets a first number of determination data elements to an increased number of determinations for a predetermined period, the first number of determination data elements being a number of data elements of the distance to the object to be used for determining whether the object is the obstacle, the increased number of determinations being larger than a second number of determination data elements to be used for a situation in which the signal level of the receiving wave does not exceed the predetermined threshold,
   wherein the obstacle determinator determines whether the vehicle is running based on the vehicle speed acquired by the vehicle speed acquisition device, and
   wherein, in response to determining that the vehicle is running, the obstacle determinator sets the first number of determination data elements to the regular number of determinations, which is the second number of determination data elements to be used for the situation in which the signal level of the receiving wave does not exceed the predetermined threshold.

2. The obstacle detection apparatus according to claim 1, wherein, when the current distance to the object calculated by the distance calculator is less than or equal to a preset short distance threshold, the obstacle determinator sets the first number of determination data elements to a regular number of determinations as the second number of determination data elements to be used for the situation in which the signal level of the receiving wave does not exceed the predetermined threshold.

3. The obstacle detection apparatus according to claim 1, wherein, in a case where it is determined that a time interval during which the signal level exceeds the predetermined threshold is not closer to a transmission time interval in which the transceiver transmits the transmission wave even when the signal level of the receiving wave monitored by the reception level monitoring device exceeds the predetermined threshold, the obstacle determinator sets the first number of determination data elements to the regular number of determinations as the second number of determination data elements to be used for the situation in which the signal level of the receiving wave does not exceed the predetermined threshold.

4. The obstacle detection device according to claim 1, further comprising:
   a transmission timing controller that controls transmission timing at which the transmission controller controls the transmission wave to be transmitted, and sequentially changes a cycle of the transmission timing.

5. The obstacle detection apparatus according to claim 1, wherein:
   the transceiver, the transmission controller, and the receiver circuit are arranged at each one of a plurality of ultrasonic sensors;
   the reception level monitoring device monitors the signal level of the receiving wave detected by the receiver circuit of each of the plurality of ultrasonic sensors; and
   the obstacle determinator sets the first number of determination data elements to the increased number of determinations for a predetermined period in one of the plurality of ultrasonic sensors, which detects the signal level exceeding the predetermined threshold, and in another one of the plurality of ultrasonic sensors adjacent to the one of the plurality of ultrasonic sensors.

6. The obstacle detection apparatus according to claim 5, wherein the obstacle determinator sets the first number of determination data elements to the increased number of determinations for a predetermined period in the plurality of ultrasonic sensors, the first number of determination data elements being determined based on at least one of the plurality of ultrasonic sensors, which detects the signal level exceeding the predetermined threshold.

7. The obstacle detection apparatus according to claim 5, wherein:
two or more of the plurality of ultrasonic sensors are arranged at one end face of the vehicle; and,
when at least one of the two or more of the plurality of ultrasonic sensors arranged at the one end face of the vehicle detects the signal level exceeding the predetermined threshold, the obstacle determinator sets the first number of determination data elements to the increased number of determinations for a predetermined period in all of the two or more of the plurality of ultrasonic sensors arranged at the one end face of the vehicle.

8. The obstacle detection apparatus according to claim 1, wherein the ultrasonic wave received by the transceiver includes a reflection wave of the transmission wave reflected by the object.

\* \* \* \* \*